United States Patent [19]

Ingersoll

[11] 4,146,119
[45] Mar. 27, 1979

[54] IMPACT-RESISTANT CARBON CURRENT COLLECTORS

[75] Inventor: W. King Ingersoll, St. Marys, Pa.

[73] Assignee: Airco, Inc., Montvale, N.J.

[21] Appl. No.: 827,520

[22] Filed: Aug. 25, 1977

[51] Int. Cl.² .............................................. B60L 5/08
[52] U.S. Cl. ..................................... 191/55; 191/59.1
[58] Field of Search .................. 191/45 R, 50, 55, 57, 191/58, 59.1, 62, 65; 293/1, 71 R; 310/219, 228, 238, 245, 248, 253

[56] References Cited

U.S. PATENT DOCUMENTS

| 2,221,611 | 11/1940 | Schaake | 191/55 |
| 2,844,387 | 7/1958 | Shaw | 293/71 R X |
| 3,017,529 | 1/1962 | Helwig | 310/248 |

OTHER PUBLICATIONS

Dixon; D. L., "Development with Carbons for Current Collection", *Railway Engineering Journal,* vol. 2, No. 5, pp. 46-59 (Sep. 1973).

Morganite Carbon Limited, "Carbon Collectors for Electric Railways and Trams", Application Data, Ref. No. ADS 6, 1967.

*Primary Examiner*—Stephen G. Kunin
*Attorney, Agent, or Firm*—Edmund W. Bopp; Larry R. Cassett

[57] ABSTRACT

An improved carbon current collector is provided which is resistant to breakage due to sudden impacts in service. The invention is particularly useful when applied to pantographs for electric locomotives or trains, and comprises a carbon current collector to which is affixed a resilient pad.

3 Claims, 4 Drawing Figures

DIRECTION OF TRAVEL

IMPACT-RESISTANT CARBON CURRENT COLLECTORS

FIELD OF THE INVENTION

The present invention is useful in connection with carbon current collectors which are designed for sliding contact with an electric current carrying conductor. More particularly, the invention relates to current collecting carbons used on the pantographs of electric locomotives and self-propelled cars, which slide against overhead wires along which there may be obstructions and/or discontinuities.

BACKGROUND OF THE INVENTION

In the design of railroad system, it has become common practice to utilize electric locomotives and self-propelled cars which draw electric power from overhead wires via carbon collectors mounted on pantographs. The carbon collectors make sliding contact with the lower surface of the wire suspended thereover. See D. L. Dixon, "Development with Carbons for Current Collection", *Railway Engineering Journal*, Vol. 2, No. 5, pp. 46–59 (September 1973) for a history of the development of carbon collectors for use with pantographs. Carbon for pantograph applications may be made by any one of a number of processes (See Liggett, "Carbon-Baked and Graphitized, Products, Manufacture", Encyclopedia of Chemical Technology, Vol. 4, 2d.Ed., pp. 158–202 (1964). Carbon has become a preferred material for pantograph current collectors because it offers greatly decreased wear of the overhead wire and of the carbon in comparison with the metal collectors used previously. Moreover, lubrication is not necessary with carbon shoes. However, the grades of carbon used all suffer from the same defect, that of brittleness. As the overhead wire is usually suspended from a catenary cable by hangers, which tend to come loose and hang below the wire, the shoes often strike these hangers with extremely detrimental results. Moreover, the overhead wire is usually discontinuous, such discontinuities occurring at the junction of electrically isolated "sections" and at appurtenances such as draw bridges. Frequently foreign objects are maliciously or accidentally thrown over the overhead wire. Impact with any such objects causes chipping or fracture of the carbons. As most locomotives are fitted with a pluality of carbon collectors, this breakage does not often lead to an interruption of service; however, the carbons must be more frequently inspected and serviced than is desirable, and in fact many pantograph carbons are broken before they wear out, and must be discarded. The difficulty, of course, is further compounded by high train speeds, which are increasingly common.

OBJECTS OF THE INVENTION

It is therefore an object of the invention to provide an improved current collector for electric railway use and the like.

It is a further object of the invention to provide a carbon current collector with improved resistance to damage created by impact with a fixed object.

SUMMARY OF THE INVENTION

The present invention achieves the objects mentioned above by providing a carbon current collecting member having a pad of a resilient material attached to its leading edge. If, for example, a pad of silicone rubber is affixed to the leading edge of a carbon collector used on the pantograph shoe of a high-speed electric locomotive, it is found that the service life of the collector is quite remarkably increased.

BRIEF DESCRIPTION OF THE DRAWINGS

The invention will be better understood with reference to the drawings, in which.

DESCRIPTION OF THE PREFERRED EMBODIMENT

Figure 1:
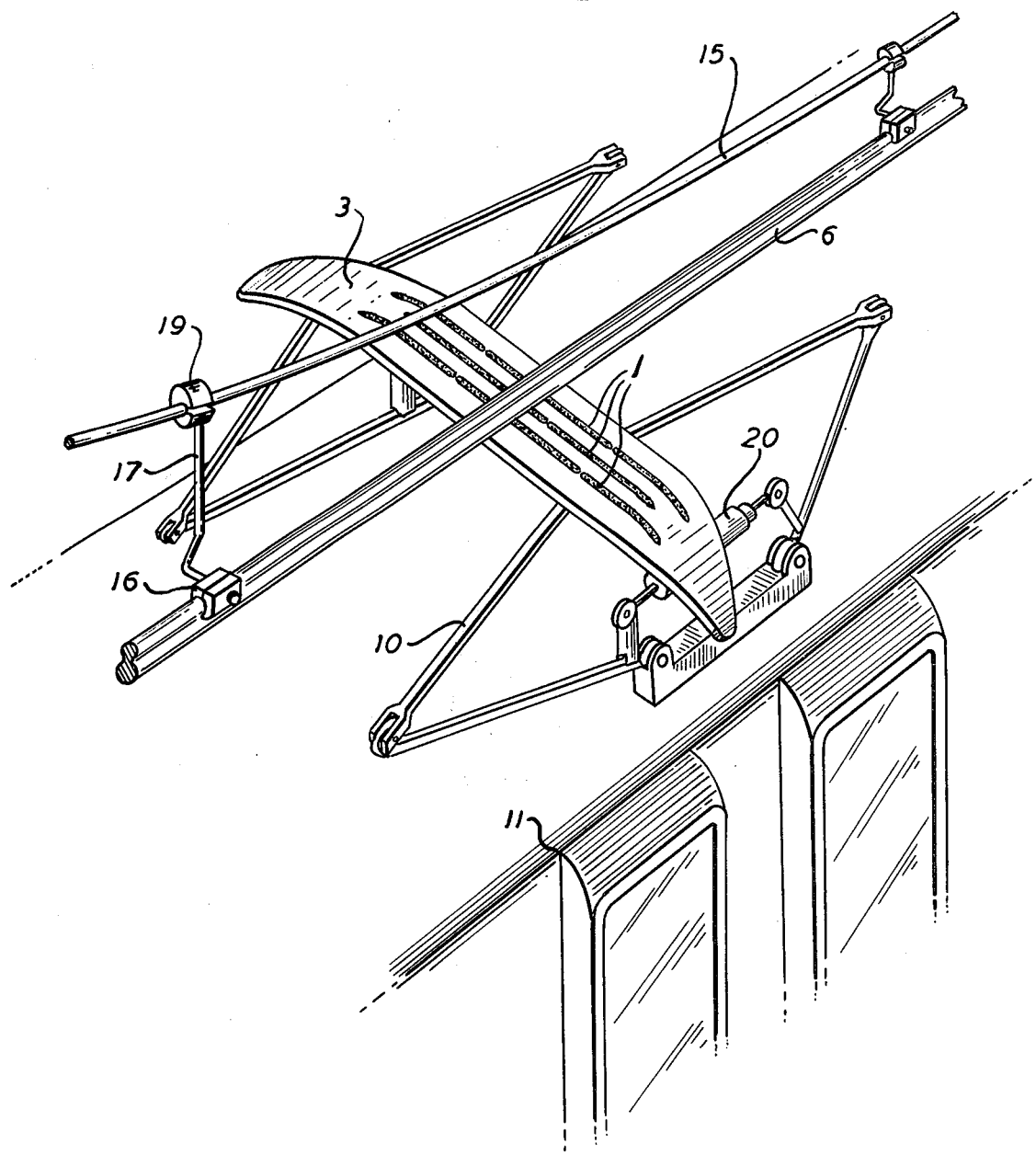
FIG. 1 is a perspective view of a current collecting pantograph in operative position against an overhead current supply wire, as typically used on electric railways.

It will be appreciated by those skilled in the art that current collectors of all sorts frequently operate under very poor conditions. In railway operation, for example, weather conditions, limited maintenance, high speeds, high electrical loads, and the requirement of long and reliable life are all crucial factors in the selection of materials. Carbon is suitable for long-term, high temperature use, as in motor brushes and the like, but is very brittle. Thus, in circumstances where impacts against fixed objects are frequent, some improvement in or addition to the carbon is necessary.

This difficulty is resolved by the present invention in which a resilient material is affixed to the carbon in the place where most impacts take place, the leading edge. The function of the resilient material is to spread the impact or shock load over a large portion of the brittle carbon and provide some cushion for the shock. It is found that a light hammer blow to an unprotected carbon collector will ordinarily chip or fracture the carbon. If the carbon is padded in accordance with the invention, the hammer blow will not damage it.

It is well-known that the violence of impacts between objects having relative velocity is measured by the coefficients of elasticity of the objects. A hard object is considered to have a high coefficient of elasticity, and a softer object, a lower one. This coefficient provides a rough measure of the time taken for the kinetic energy of an impact to be absorbed, a soft object absorbing the energy over a longer time than a hard object. The same total energy transmitted over a longer time translates into a lower applied force, thus "softening" the blow.

Several qualities of a suitable resilient material are essential to its success as a cushion for carbon pantograph current collectors. It must have wear properties compatible with the carbon; if it wears more slowly than the carbon, it will tend to prevent the carbon from making good contact with the wire. It must be able to withstand the heat and emitted radiation from electrical sparking without deterioration; it must be resistant to all weather conditions, including specifically, ice and subfreezing temperatures, and it must not break down at high local temperatures, as occur during, e.g., heating of a stationary car; it must at once be firm enough to distribute the shocks, but soft enough to deform and absorb the energy over a short period of time; and it must be capable of being permanently affixed to the carbon by means which have similar properties.

One material which has been proven suitable for carbon collector padding is that known as silicone rubber. A suitable silicone rubber is known as "Silastic", made by Dow Corning Corporation, and described by them as a "highly stable, hybrid elastomer". Pads cut from sheets or strips of this material may be attached to carbon collectors essentially covering their leading edges. A suitable adhesive is another material made by Dow Corning Corporation, described by them as a vulcanizing silicone rubber adhesive, and sold under the trademark Silastic 732 RTV; other materials having similar properties might, of course, be used in place of either the silicone rubber or the adhesive mentioned.

A specific embodiment of the invention will now be described with reference to the drawings. In FIG. 1 there is depicted a perspective view of a typical pantograph assembly 10 as mounted on a locomotive roof 11. Bow 3, carrying three carbons 1, is mounted atop pantograph 10, and is urged against wire 6, which depends from a catenary support wire 15, by hydraulic cylinder 20. The contact wire 6 is hung from support catenary 15 by means of clamps 16 and 19 which are connected by wire cables 17.

Figure 2:
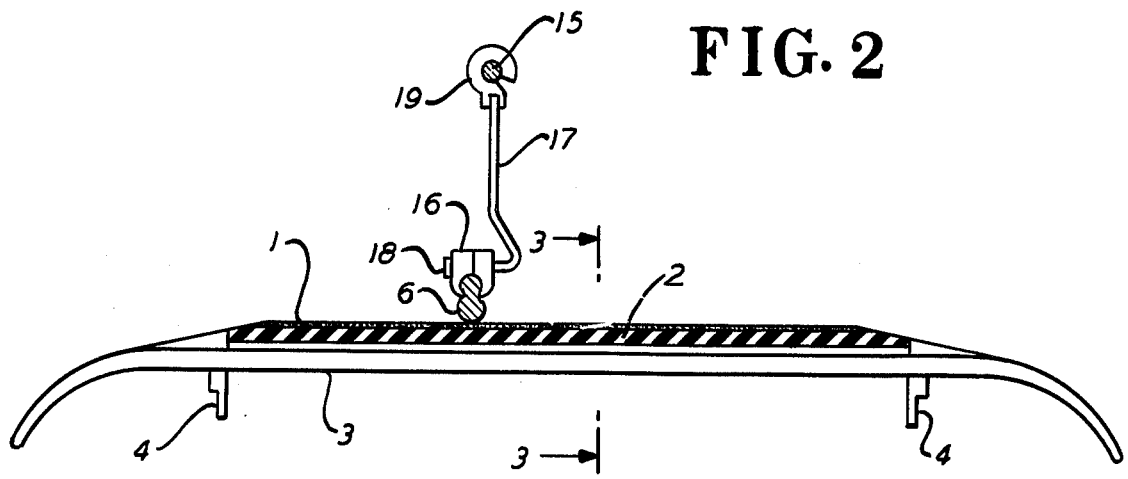
FIG. 2 illustrates a pantograph bow fitted with carbon current collectors in accordance with the present invention, in contact with an overhead supply wire, the view being in the direction of the leading edge.

In FIG. 2 there is depicted an elevation of the pantograph bow 3, as seen from the front of the locomotive on which it is mounted, and a wire 6 with supporting structure. Carbons 1 are shown partially obscured by rubber pads 2, which are affixed to the carbons 1. The carbons 1 with their pads 2 are carried on a bow 3, which in turn is supported by brackets 4. Pressure, supplied by springs or by air or hydraulic pressure, is applied to supports 4 by the pantograph structure to urge the carbons 1 against the current supply wire 6, which is shown disproportionately large for clarity. As described above, the current supply wire 6 depends from an overhead catenary 15. The wire 6 is typically of roughly hourglass cross-section, as shown, so that a hooked clamp 16 may positively engage the grooves in the wire 6; a screw 18 holds the halves of clamp 16 together. Clearly, if screw 18 is loosened by vibration, the clamp will release the wire, and may then hang below the wire, and be struck by the carbon collectors of passing trains. The overall length of the carbons 1 and pads 2 is typically about 35 inches (89 cm). As will be seen from FIG. 3, several carbons 1 are often used, so as to spread the wear and the electrical load over more surface area, and so that if support 4 is pivoted about a point P, the assembly can tilt in order to compensate for irregularities in the pantograph's alignment with respect to the wire. Carbons 1 are typically 1 in. (2.5 cm) thick, and 1.3 in. (3.3 cm) wide. The three carbons 1 shown in FIG. 3 may each be made up of several individual pieces so that broken or worn out sections may be replaced without excessive waste.

Figure 3:
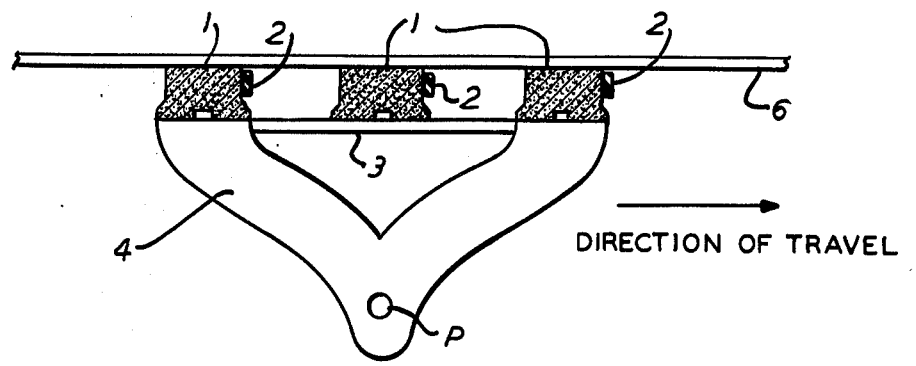
FIG. 3 is a sectional view along line A—A of the pantograph bow of FIG. 2.

FIG. 3 is an enlarged cross-section taken along line A—A of FIG. 1. In this Figure the pad 2 is on only one side of each carbon; this arrangement is suitable for pantographs on locomotives which travel almost entirely in one direction. Obviously, if a locomotive which was used extensively in both directions having a single pantograph were fitted with padded carbons, they would be advantageously padded on both sides. Some locomotives are fitted with two pantographs, one for use in each direction. Here the carbons would desirably be padded on one side only, but the carbons on one pantograph would be padded on the opposite side from those on the other.

Figure 4:
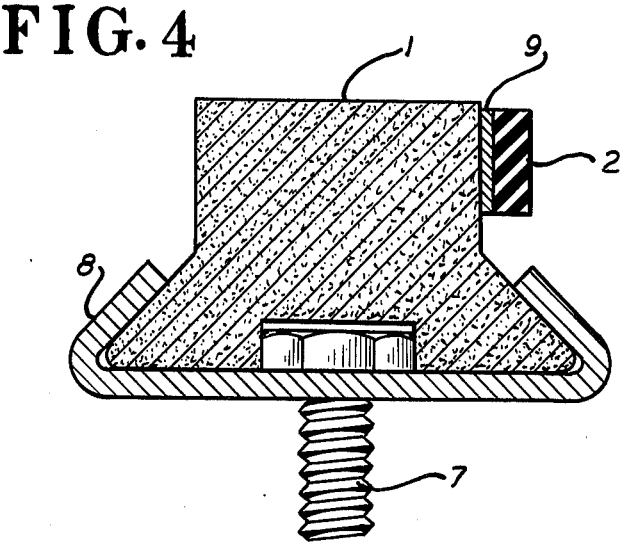
FIG. 4 is an enlarged sectional view of one of the pantograph carbons of FIG. 3.

A detailed rendering of a suitable method of mounting the carbons 1 is shown in FIG. 4 which is an enlarged showing on one of the carbons of FIG. 3, together with details of the pad 2. The carbon is made with an outwardly tapered bottom section, so as to be capable of engagement by a metal clamp 8, made of, e.g., galvanized steel sheet. Clamp 8 is perforated, and carbon 1 is grooved on its base for bolts 7, which are then used to fasten the assembly to bow 3. Pad 2, of silicone rubber as discussed above, may typically be ⅛ in. (3.2 mm) thick, ½ in. (13 mm) high, and run the full length of the carbon. Pad 2 may be suitably attached with a thin layer of adhesive 9. This combination of materials and dimensions has proven to be effective in reducing the breakage rate of otherwise identical carbons.

Carbon pantograph collectors are prepared using conventional processes as described in the article by Liggett cited previously. Depending on the shape of the article being made, the carbon is either molded or extruded to shape. For example, in the case of the long shoes described above, the cross-section of the carbon is uniform from end to end, and the "green" carbon can therefore be extruded in long lengths, cut to length, and baked to carbonize it. In the case of a trolley car carbon collector the carbon insert is of a complicated shape, and may be molded rather than extruded; the baking step is the same. In some cases it is desirable that the carbon be metal impregnated. If this is desired, the part is vacuum-pressure impregnated with copper or other metal by conventional impregnation methods. The metal content is typically 20–30% by weight.

Baked carbon is preferred over graphitized carbon as it is much harder and therefore wears more slowly; the advantage provided by the higher electrical conductivity of graphitized carbon can be matched by the impregnation of a conductive metal into the baked carbon product.

As described above, when the padded surface strikes a dangling hanger, a discontinuity in the wire, or some other interfering object, the padding spreads the impact over the surface of the carbon, and over a short but significant interval of time, thus reducing the instantaneous energy absorbed by any part of the carbon surface and preventing all but the most severe impacts from fracturing or chipping the carbon.

In a test conducted jointly by the assignee of the invention and Conrail, carbons manufactured by the assignee were mounted on thirty GG-1 electric locomotives. These locomotives are each equipped with two pantographs, only one of which is in use at any given time; each pantograph is fitted with eight individual carbons in three rows of 3-2-3 pieces each. The locomotive pantographs are inspected at 30-day intervals. The unpadded carbons broke at the average rate of 1.89 carbons per pantograph per month.

Padded carbons were then tested, each having a pad of silicone rubber, ½ in. (13 mm) high and ⅛ in. (3.2 mm) thick, cemented onto the leading edge of the carbon with Dow Corning silicone rubber adhesive. Eight locomotives were so equipped. It was found that the breakage rate dropped to 0.35 carbons per pantograph per month, and that both padding and adhesive withstood impacts, electrical arcing, heat and vibration very well, and did not deteriorate under service conditions.

It will be appreciated that the invention which is the subject of the present application has applicability beyond the pantograph carbons described herein; it is useful in any situation involving carbon contactors which make sliding contact with another surface that might include interfering obstructions. Furthermore, it will be apparent that there are numerous modifications of the invention as described, obvious to those skilled in the art, which are within the spirit and scope of the following claims.

I claim:

1. In a carbon current collecting contactor for sliding contact with an electrically conductive surface, the improvement which comprises having at least one impact absorbing resilient pad of silicone rubber mounted adjacent the sliding contact surface on the surface of the contactor which faces in the direction of travel of the contactor.

2. In a carbon current collecting contactor for sliding contact with an electrically conductive surface, the improvement which comprises having at least one impact absorbing resilient pad affixed to the contactor by means of a vulcanizing silicone rubber adhesive adjacent the sliding contact surface on the surface of the contactor which faces in the direction of travel of the contactor.

3. A current collecting pantograph assembly for electric railway traction motor current supply comprising in combination at least one carbon current collector adapted to make sliding contact with an elongated supply conductor and an impact absorbing resilient silicone rubber pad mounted on the leading edge of said collector.

* * * * *